United States Patent [19]
Hill

[11] 3,977,850
[45] Aug. 31, 1976

[54] CENTRIFUGAL SEPARATOR
[75] Inventor: Ernest C. Hill, Tulsa, Okla.
[73] Assignee: Combustion Engineering, Inc., Windsor, Conn.
[22] Filed: Feb. 17, 1976
[21] Appl. No.: 658,210

[52] U.S. Cl. .............................. 55/419; 55/459 C
[51] Int. Cl.² ......................................... B01D 45/12
[58] Field of Search .................. 55/419, 452, 459 C, 55/349

[56] References Cited
UNITED STATES PATENTS

| | | | |
|---|---|---|---|
| 2,346,005 | 4/1944 | Bryson | 55/459 D |
| 2,595,737 | 5/1952 | Rotz | 210/512 |
| 3,074,218 | 1/1963 | O'Dell et al. | 55/346 |
| 3,423,941 | 1/1969 | Evans | 55/455 |
| 3,793,812 | 2/1974 | Willis | 55/457 |
| 3,884,660 | 5/1975 | Perry et al. | 55/485 |

*Primary Examiner*—Bernard Nozick
*Attorney, Agent, or Firm*—Arthur L. Wade

[57] ABSTRACT

A diagrammatic representation of a single tube is housed to form a gravity separation chamber for the liquid separated from gas by the tube, and the tube is shown to be in several axially aligned sections spaced from each other to provide the exits and reentry paths between the tube and chamber for the separating fluids.

6 Claims, 2 Drawing Figures

CENTRIFUGAL SEPARATOR

BACKGROUND OF THE INVENTION

1. Field of the Invention

The present invention relates to the liquid-gas separation system now variously, and collectively, called the in-line centrifugal, vortical, and gas recycling system. More specifically, the invention relates to generating the centrifugal force of separation and the pressure pattern for gas recycling.

2. Description of the Prior Art

Porta-Test Manufacturing Ltd., Edmonton, Alberta, Canada, a company of Alberta is the face-owner of U.S. Pat. No. 3,481,118, dated Dec. 2, 1969. The system of this patent discloses the generation of centrifugal force on liquid-entraining gas to wet the walls of a tube from which the liquid is skimmed through a gap in the wall. The gas, which also flows through the gap, is recycled and discharged as liquid-stripped gas.

The corporate history of Porta-Test is uncertain, but U.S. Pat. No. 3,793,812, dated Feb. 26, 1974 is apparently owned by Porta-Test also. The '812 patent aligns with commercial literature enough to affirm Porta-Test is embodying the principle of centrifugal force generation in a pipe unit which can be duplicated in the multiples to meet the quantity demand of separation problems. It is the arrangement for generating the centrifugal force and the recycle pressure system that needs improvement.

The field conditions to be met are generally well known in the art. The '812 patent addresses the conditions somewhat narrowly. Natural gas transmission lines are described as entraining liquid quantities in the order of 1 to 10 gal./MMscf. The specifications, generally, are to remove 99%, or over, of 5 micron, and larger, liquid drops of this entrained liquid. Of course it is expected to carry out this removal with as little pressure drop as possible through any separating structure.

The applications for this separating structure are not limited to transmission lines. There are separating demands close to the well-head, in the production flow stream. Here the oil and water that is not bound up in an emulsion may be roughly separated by baffled vessels into separate compartments. However, the gas may entrain liquids of 5 microns and greater. It is this separation problem which is addressed.

Porta-Test is only one manufacturer who applies gas recycling vortical tube to the problem. The Perry Equipment Corporation has developed a so-called "Cyclotube" separation system which falls in this category. Perry uses a structure to spin the mixture processed which is technically different from the "Whirly Jig" of the Porta-Test system. However, both systems skim the centrifuged liquids from their tube wall and recycle the gas portion applied in expelling the liquids through an opening in the tube wall.

There remains in the art a problem in increasing the centrifuging force on the liquids and simplifying the structure required to generate the differential pressure to recycle the carrier gas.

SUMMARY OF THE INVENTION

It is an object of the present invention to generate a centrifugal force on liquids entrained in a gas stream by directing the mixture of fluids tangential to the diameter of a conduit. The centrifugal force on the entrained liquids carries them to the internal walls of the conduit which they wet and on which they flow to an exit opening through the conduit wall. The liquids flow through the exit opening under the force of a portion of the gas and are thereby separated from the main stream of the gas.

It is another object of the invention to develop a low pressure zone in the conduit between the tangential entry and the exit opening with a simple reduction in the cross section of the conduit adjacent a second conduit opening in the wall. The gas portion which forced the liquid through the exit opening flows from outside the tube to the low pressure zone through the second opening to rejoin the main stream of the gas.

Other objects, advantages and features of this invention will become apparent to one skilled in the art upon consideration of the written specification, appended claims, and attached drawings, wherein;

FIG. 1 is a diagrammatic and sectioned side elevation of a simple tubular structure in which the present invention is embodied; and FIG. 2 is a perspective of the initial entry system into the tube.

DESCRIPTION OF THE PREFERRED EMBODIMENT

Figure 1:
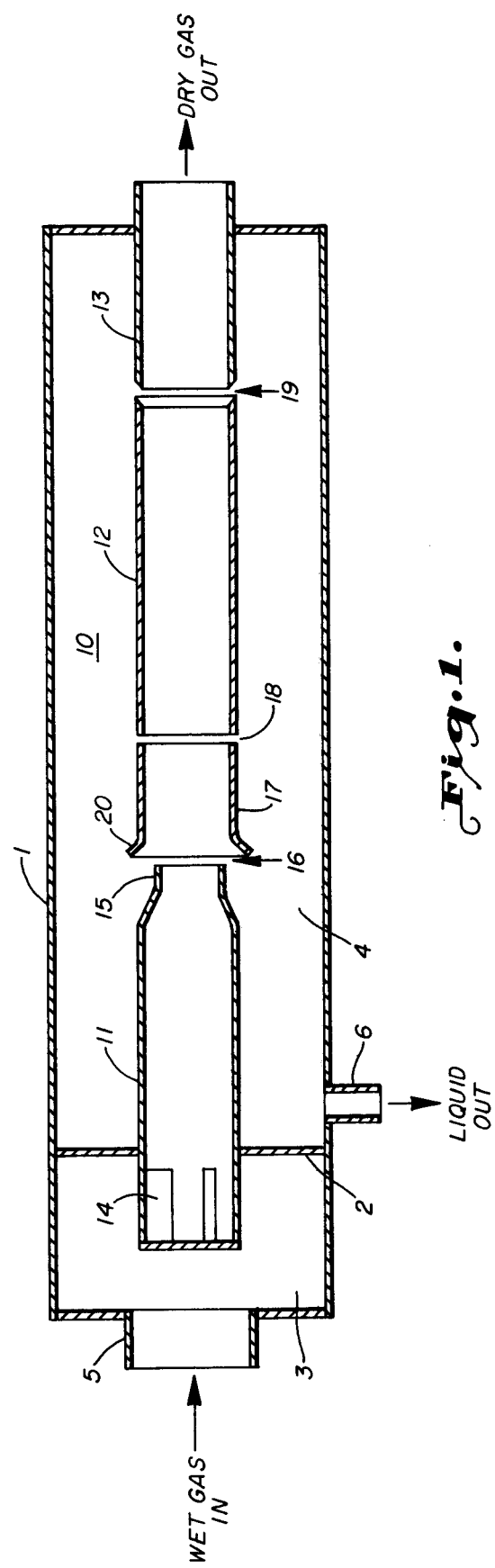

Although the showing of the structure in FIG. 1 is somewhat diagrammatic, it is adequate for disclosure of the invention. The nature of the embodied invention is so simple that the structural details are readily understood and the claims defining the invention readily parallel the disclosure of both FIG. 1 and FIG. 2.

Separating structures of this type have been called by various names, all orienting about the use of centrifugal force generated on the mixture of fluids being processed into separation. An additional common denominator is the tubular configuration which is central to the separating structure. Therefore, the separator may be casually referred to as a centrifugal, tubular, separator. As the gaseous portion of the separated fluids has a path out of the tube and an entry path into the tube it is often referred to as recycling gas. These features give rise to a wide variation in descriptive names for the structure. Even I have coined the name, "Centritube". Whatever it is called, the unit has very definite configurations when embodying the present invention. These configurations will now be carefully disclosed in a systemmatic fashion.

In FIG. 1 a housing 1 is shown in section to also disclose the tubular structure mounted coaxially within the housing. It is understood that housing 1 could contain more than one tubular assembly, each receiving a share of the mixture to be separated. Further, the housing 1 could be part of a more extensive housing in which upstream separation of the fluids could be preparatory for the separation carried out by the tubular structure. However, to disclose duplicate tubes and other separating structure could not add to the disclosure of the invention.

Housing 1 performs two basic functions, in addition to serving as a mount for the separating tube. First, the housing is compartmented to receive the mixture to be separated and direct it into one end of the tube. Second, the housing collects the separated liquid and drains it a predetermined location. To carry out these two functions, a compartment wall 2 divides the housing 1 into inlet compartment 3 and gravity separation compartment 4.

The gas and liquid mixture enters inlet compartment 3 through inlet conduit 5 for insertion into the tubular separator. The liquid stripped from the gas within the tube is ejected into compartment 4 to collect and drain from the compartment 4 through outlet conduit 6.

SEPARATING TUBE IN GENERAL

The separating tube is properly called a vortex tube because a vortex of the fluids flowing into the tube is created to place centrifugal force on the mixture of fluids it processes into separate fluids. Broadly, tube 10 is comprised of an inlet section 11 of pipe, vortex pipe 12 and outlet pipe 13. Together, these pipes are axially aligned with gaps of carefully predetermined widths between them. Through these gaps the separated liquid is discharged, with a certain amount of the gas, and the gas is recycled back to the main flow stream of the mixture.

Thus far the disclosure is comparable to the prior art structures, both in form and function. The present invention comes into the disclosure with means to generate centrifugal force on the mixture within inlet section 11, the arrangement to generate the pressure difference between compartment 4 and within the tube 10 to recycle the gas which has urged the liquid into compartment 4 and the rather specific sizing of the pipes of the separator tube to carry out the desired functions with a minimum total length of the separator tube.

INLET SPINNER SECTION 3

Figure 2:
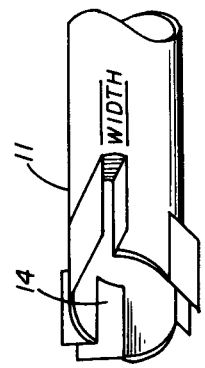

Wall 2 supports the entry end of tube 10. The upstream end of the inlet section 11 of pipe 10 has nozzles 14 forming a flow path for the fluid mixture of inlet conduit 5 to enter the tube. FIG. 2 discloses these nozzles in greater detail.

Many different configurations of structure were tried on the upstream end of inlet section 11 before it was discovered that three to four nozzles, tangent to the diameter of the tubular inlet section 11 provide the optimum centrifugal force on the mixture with the least pressure loss.

A spinner was tested with a four nozzle inlet of 5 sq. in. total area. Its orifice flow coefficient for complete liquid removal is 0.197 at 200 ACF/M of air flow. 0.15 gallon/minute of liquid diesel fuel is removed from gas at that rate with no carryover. At 200 ACF/M the pressure drop across the complete separator of FIG. 1 is only 16 inches of water column.

A spinner was tested with a three nozzle inlet of 5 sq. in. total area. Its orifice flow coefficient for complete liquid removal is 0.0146 at 200 ACF/M of air flow. 0.25 gallon/minute of liquid diesel fuel is removed at that rate. A 25 inch pressure drop is developed across the separator.

This comparison between the four and three nozzle inlet for the spinner is only representative of the many configurations tested and compared. The conclusion, in fact the discovery, is that the three nozzle entry tangent to the pipe inside diameter and spaced 120° apart on an inlet section of 3 inch standard pipe diameter gave the more satisfactory result of liquid removal versus pressure drop. The nozzles, then, each have a width of no less than 0.5 and not more than 0.65 inches to provide an area of 1.67 square inches. The overall length of the inlet section could then be limited to a minimum length of 6D or 18 inches and function as required.

EJECTOR NOZZLE

The downstream end of the inlet section of pipe is formed to generate a pressure in the tube less than the pressure in the gravity separation chamber. With this pressure difference, the flow of gas from the gravity separation chamber is established.

The prior art has generated this pressure difference with several types of structure mounted in the tube. The simple configuration disclosed here is adequate and not as complex as the prior art.

What I have done is to simply reduce the diameter of the downstream end of the inlet section of pipe to form ejector nozzle 15. This structure functions as a venturi tube in generating a reduced pressure area just downstream of itself. The velocity of the fluid stream through the nozzle will increase.

Of course this ejector nozzle 15 generates more overall pressure drop in the separator. Therefore, some experimenting was required to discover a reduction which would generate the required differential without exceeding the desired limit of overall pressure drop through the separator. Specifically, in a 3 inch diameter pipe for the inlet section, the ejector nozzle discovered to be satisfactory is formed by reducing the 3 inch diameter to 2 to 2¼ inches. Further, the downstream opening of the axially aligned vortex pipe is spaced ½ inch from the discharge opening of the ejector nozzle. This gap at 16 provides an adequate passageway for the recycling of the gas which urges the liquids to flow along the wall, out of the vortex tube and into chamber 4.

VORTEX PIPE

To this point I have cited the complete tube of three essential parts as the vortex tube. This designation is not to be confused with that part of the tube between the ejector nozzle 15 and the outlet pipe 13. This complete vortex pipe is the unit designated 12 in FIG. 1.

Actually, the reduction to practice of pipe 12 may include two sections. The first of these sections is the so-called bulk liquid section 17, upstream of the larger portion of the vortex pipe 12. They are separated by a gap at 18.

A third gap 19 is formed between the downstream end of vortex pipe 12 and the upstream end of outlet pipe 13. These are the two gaps 18, 19 through which the liquid, separated from the gas in the vortex tube, is expected to exit to the gravity separation chamber 4 and discharge through outlet conduit 6.

REVIEW

Even from the prior art, it is understood how the vortex tube generally works. Some device, here the nozzles 14, force the mixture of gas and liquid into a spin, vortex, etc., as the mixture also flows down the tube. The centrifugal force throws the liquid to the internal walls of the vortex tube. This film of wall-wetting liquid is expected to flow through a downstream gap in the wall of the tube. In this disclosure, the liquid exits from gap 18 and 19. Possibly one gap would accommodate the liquid. Certainly the two disclosed will be adequate.

Gas also flows from the gaps. As a matter of fact, the gas is the primary force urging the liquid through each exit gap. This gas is recycled back into the vortex tube through gap 16. The low pressure generated by the venturi effect of ejector nozzle 15 at gap 16 forces the gas back into the vortex tube.

Again, it is the spinning device at 14 and the ejector nozzle structure for developing the low pressure at gap 16 which lifts this invention above the prior art. The effectiveness of the nozzles 14 and the simplicity of the ejector nozzle in reducing pressure are the functions of these specific improvements in this art.

VORTEX PIPE — BULK LIQUID SECTION 17

Vigorous investigation ended in the discovery that if the section 17 in a 3 inch pipe were made 2D or 6 inches in length and spaced 3/32 inch to 1/8 inch from the downstream remainder of vortex pipe 10, most of the liquid would discharge to chamber 4. It was then discovered that the remaining length of the vortex pipe could be a minimum of 8D or 24 inches in length if the vortex tube was being operated in a vertical position and the remainder of the liquid on the walls would exit through a 1/8 inch gap 19.

It was further discovered that if the 3 inch vortex tube were operated in a horizontal position the minimum length of the vortex tube downstream of gap 18 could be held to 15D or 45 inches for more complete separation of the liquid drops down to 5 microns. Thus we arrive at a formulation. The longer length should be used, but where space is a premium, the shorter length can be effective if vertical operation is acceptable.

VERTICAL OPERATION

In many applications it is expected that the vortex tube will be accepted in a vertical position. Indeed, it may be desired to mount it vertical to save space. In general this should raise no operational problems. Vortexing and separation and gas recycling will take place in the vertical and horizontal orientation. However, in the vertical position, a significant portion of the liquid flowing from gap 18, and even gap 19, will descend by gravity and pass near return gap 16. This can be bad as this portion of the liquid can be drawn back into the vortex tube.

The solution to this problem is to provide a drip rail, or skirt, 20. Liquid sliding down the outside of section 17 will then be directed away from gap 16 by this flared skirt, or rail, and drip therefrom to descend to the low part of chamber 4.

Becoming more specific, drip rail 20 is embodied in a flare of the upstream end of section 17. This flare is formed at a 60° angle to the pipe facing upstream and is 1 1/4 inch wide. This shape, form, configuration and dimension will effectively carry the liquid flowing down the sides of section 17 outward far enough to avoid recycling of this liquid through the system instead of being discharged through outlet 6 as desired.

CONCLUSION

As always, the technology of liquid separation will allow flexibility in the dimensions disclosed. However, the invention begins with the broad concept of nozzles directing the fluid mixture being separated tangent to the internal diameter of a pipe. This concept gives a tighter spin to the fluids than disclosed by in this particular prior art. More specifically, it was discovered that three nozzles, spaced 120° apart, gave the improved spin without excessive pressure drop over the complete length of the tube. Additionally, the 3 inch standard pipe diameter proved a reasonable selection for the pipe, or tube, and nozzle dimensions of no less than 0.5 inches and not more than 0.65 inches with a total area of 5 square inches gave a surprisingly good balance between separation efficiency and induced pressure drop through the pipe.

Secondly, the problem of providing a simplistic structure to recycle the gas portion which exits with the recovered liquid was met by reducing the cross section of the pipe downstream of the nozzles. Here, the structure became rather specific from the outset. Some form of restriction has long been used in the prior art to develop a pressure pattern which will force circulation of a portion of the process gas from out of the tube to return to the tube in separating liquid. However, the prior art does not show a simple diameter reduction of the pipe downstream of the entry. Carefully placed 6 diameters downstream of the entry nozzles, the so-called ejector nozzle is effective in a 3 inch diameter pipe if formed by a reduction of the 3 inch pipe to 2 inches to 2 1/4 inches diameter. The decreased pressure the ejector nozzle generates downstream is surprisingly effective in forcing the gas portion ejected from the tube with the separated liquid to recycle back into the tube from one or two downstream exit gaps in the tube wall.

Beyond these two broad concepts of nozzle entry and venturi low pressure generation, the dimensions discovered and claimed are valid results of the search for a vortex tube separator which must be kept within a reasonable length yet strip 5 micron sized liquid drops entrained in gaseous fluid to the efficient level of 99%, or better, removal.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. For use in a liquid-gas separator, a vortex tube assembly for processing gas which is mixed with entrained liquid in drops of 5 micron and larger, including, an inlet section of pipe closed at the extreme end and having a length of 6D and adapted to receive the mixture, a vortex pipe axially aligned with the inlet section of pipe and spaced from the inlet section to define a gap and having a length of 10D, an outlet pipe axially aligned with the inlet and vortex pipe and spaced from the vortex pipe to define a gap, a plurality of nozzles mounted on the inlet section of pipe to receive the gas and entrained liquid and direct the fluid mixture tangent to the internal diameter of the pipe, and an ejector nozzle on the exit end of the inlet section of pipe formed by reducing the cross section of the pipe.

2. The vortex tube of claim 1 in which, the inlet section and vortex pipe and outlet pipe have a 3 inch standard pipe diameter, three nozzles are mounted on the inlet section of pipe and each have a width of no less than 0.5 inches and not more than 0.65 inches and a total area of 5 square inches, and the ejector nozzle is formed by reducing the 3 inch diameter pipe to 2 inches to 2¼ inches diameter and is spaced ½ inch from the opening of the axially aligned vortex pipe.

3. The vortex tube of claim 2, of which the vortex pipe comprises, a bulk liquid section 2D in length, and a downstream section 8D in length with the separator used in vertical operation.

4. The vortex tube of claim 2, of which the vortex pipe comprises, a bulk liquid section 2D in length, and a downstream section 15D with the separator used in horizontal operation.

5. The vortex tube of claim 1 in which, the outlet pipe is fixed in axial alignment with the vortex pipe and spaced ⅛ inch from the vortex pipe.

6. The vortex tube of claim 3 in which, the bulk liquid section of the vortex pipe is spaced within a range of 3/32 inch to ⅛ inch from the remainder of the vortex pipe.

* * * * *